United States Patent
Naber et al.

Patent Number: 5,941,928
Date of Patent: Aug. 24, 1999

[54] SYSTEM AND METHOD FOR MEASURING HYDROCARBON CONVERSION EFFICIENCY OF A CATALYTIC CONVERTER

[75] Inventors: Jeffrey D. Naber, Dearborn; Neil J. Adams, Novi; Donald J. Remboski, Jr., Dearborn, all of Mich.; Daniel A. Young, Gurnee, Ill.

[73] Assignee: Motorola Inc., Schaumburg, Ill.

[21] Appl. No.: 08/903,848

[22] Filed: Jul. 31, 1997

[51] Int. Cl.$^6$ ............... F01N 3/20; G01M 15/00
[52] U.S. Cl. ............... 701/109; 60/276; 73/23.31; 73/118.1
[58] Field of Search ............... 73/23.31, 23.32, 73/116, 118.1; 60/277; 123/688; 701/103, 109

[56] References Cited

U.S. PATENT DOCUMENTS

| | | | |
|---|---|---|---|
| 4,471,738 | 9/1984 | Smojver | 73/23.32 |
| 5,157,921 | 10/1992 | Ito et al. | 73/118.1 |
| 5,182,907 | 2/1993 | Kuroda et al. | 60/277 |
| 5,216,882 | 6/1993 | Kuroda et al. | 73/118.1 |
| 5,265,417 | 11/1993 | Visser et al. | 60/277 |
| 5,267,472 | 12/1993 | Schneider et al. | 60/277 |
| 5,335,538 | 8/1994 | Blischke et al. | 73/118.1 |
| 5,388,454 | 2/1995 | Kuroda et al. | 73/118.1 |
| 5,602,737 | 2/1997 | Sindano et al. | 73/118.1 |
| 5,627,757 | 5/1997 | Comignaghi et al. | 73/118.1 |
| 5,684,248 | 11/1997 | Iwata | 73/118.1 |
| 5,715,678 | 2/1998 | Aronica et al. | 73/118.1 |
| 5,737,917 | 4/1998 | Nagai | 60/277 |

OTHER PUBLICATIONS

"Internal Combustion Engine Fundamentals" by John B. Meywood, copyright 1988, pp. 146–147, 570–571.

*Primary Examiner*—George Dombroske
*Attorney, Agent, or Firm*—Nicholas C. Hopman

[57] ABSTRACT

A system and method measures hydrocarbon conversion efficiency of a catalytic converter (501). Total-combustible sensors (511, 521) are positioned to measure exhaust gas on both sides of the catalytic converter (501). Signals from these sensors (511, 521) have a magnitude comprised of a first portion, dependent on a concentration of the hydrocarbon gas in the gas stream, and a second portion, dependent on a concentration of the other combustible gasses in the gas stream, where a magnitude relationship between the first portion and the second portion is variable when the gas stream transitions into a region on the rich side of stoichiometry. The signals from these sensors (511, 521) are filtered so that a magnitude relationship between a first and second portion of the filtered signals is constant when the gas stream (506) transitions into the region on the rich-side of stoichiometry. Hydrocarbon conversion efficiency (529) is computed dependent on the filtered signals (515, 525).

21 Claims, 4 Drawing Sheets

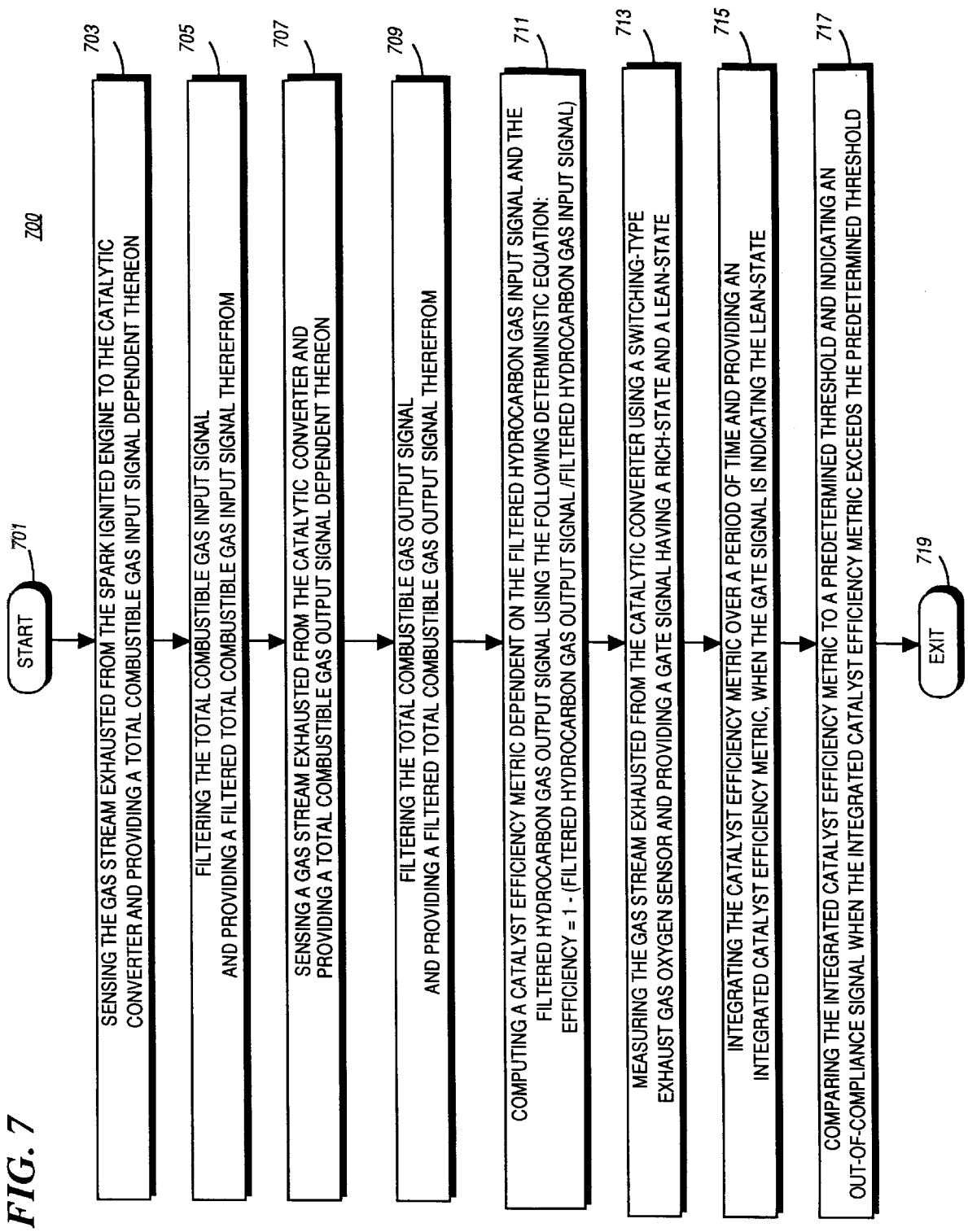

SYSTEM AND METHOD FOR MEASURING HYDROCARBON CONVERSION EFFICIENCY OF A CATALYTIC CONVERTER

FIELD OF THE INVENTION

This invention is related to the field of measuring engine emissions, and is particularly useful in vehicular applications.

BACKGROUND OF THE INVENTION

Current law in California, and laws being passed in other regions of the United States and around the world, require that emission reduction equipment incorporated on vehicles be continuously monitored by onboard-diagnostic (OBD) systems. The function of these OBD systems is to report and set fault codes when emission control devices no longer meet the mandated emission levels.

One of the systems to be monitored is the catalytic-converter, which in current automotive applications is used to simultaneously oxidize carbon monoxide (CO) and unburned hydrocarbons (HC) while reducing oxides of nitrogen ($NO_x$) in the exhaust gas stream of a spark-ignited engine. Sensors applied in these monitoring applications continuously measure gasses associated with the catalytic-converter and ascertain when the conversion efficiency of the system has been reduced to a level where it is no longer in compliance with the mandated levels of exhaust gas pollutants.

Compliance to the currently defined OBD catalyst monitoring requirement can be accomplished by either one of two metrics. The catalyst system shall be considered malfunctioning when its conversion capability decreases to the point that the HC emissions exceed the applicable emission threshold specified as follows. Transitional Low Emission Vehicles (TLEVs) applications shall employ an emission threshold malfunction criterion of 2.0 times the applicable Federal Test Procedure (FTP) hydrocarbon standard plus the emissions from a test run with a representative 4,000 mile catalyst system (125 hours of operation for medium-duty vehicles with engines certified on an engine dynamometer). The emission threshold criterion for Low Emission Vehicles (LEVs) and Ultra Low Emission Vehicles (ULEVs) applications shall be 2.5 and 3.0 times the applicable FTP hydrocarbon standard, respectively, plus the emission level with a representative 4,000 mile catalyst system. Notwithstanding, beginning with the 1998 model year, manufacturers shall phase in an emission threshold of 1.75 times the applicable FTP hydrocarbon standard for all categories of low emission vehicles, which shall not include the emission level with a 4,000 mile catalyst system. The phase-in percentages (based on the manufacturer's projected sales volume for low emission vehicle applications) shall equal or exceed 20 percent in the 1998 model year, 40 percent in the 1999 model year, 60 percent in the 2000 model year, 80 percent in the 2001 model year, with 100 percent implementation for the 2002 model year. The malfunction threshold shall be based on the emission standards to which the vehicle is certified. For LEV applications, hydrocarbon emissions shall be multiplied by the certification reactivity adjustment factor for the vehicle. Regarding the second criterion, the efficiency determination shall be based on an FTP test wherein a malfunction is noted when the cumulative Non-Methane Hydrocarbon emissions measured at the outlet of the monitored catalyst(s) are more than 50 percent of the cumulative engine-out emissions measured at the inlet of the catalyst(s).

Alternatively, the catalyst system shall be considered malfunctioning when its conversion capability decreases to the point that the average FTP non-methane hydrocarbon conversion efficiency of the monitored portion of the catalyst system falls below 50 percent.

A prior art scheme uses electrochemical exhaust gas sensors, primarily Heated Exhaust Gas Oxygen (HEGO) sensors, and their switching characteristics to deduce catalyst deterioration. Currently, zirconia based electrochemical exhaust gas sensors are used for both closed loop engine control and catalyst efficiency monitoring. As typically used, the HEGO provides an indication only of whether the equilibrated exhaust is rich or lean of stoichiometric. The primary deficiency of this prior art scheme comes in its application to the OBD systems to detect catalyst efficiency. This approach relies on measuring a ratio of a number of voltage level transitions (switches) of two HEGOs, one placed in front of the catalytic converter and one placed behind the catalytic converter. Contemporary catalytic converters have a significant oxygen storage capacity (OSC) that dampens out the normal air/fuel cycling used in engine controller strategies. Therefore, the HEGO placed in front of the catalyst records a switch every time the exhaust gas moves from either a lean-to-rich or rich-to-lean state. The aft-mounted HEGO sensor however does not record a switch every time the front HEGO sensor switches, because the OSC of the catalyst acts as an integrator, smoothing out the air/fuel oscillations. As the catalyst deteriorates because of aging, the OSC of the catalyst decreases and therefore the aft HEGO sensor records more switches. By monitoring the aft-mounted HEGO and fore-mounted HEGO sensor switching transitions for a long period and ratioing the number of switching transitions, a parameter referred to as the switch ratio is obtained. This switch ratio is a indicator of the OSC of the catalyst. This switch ratio is then used as a diagnostic parameter for determining the hydrocarbon conversion efficiency of the catalyst. The most difficult problem with this technique is that the switch ratio, which is a measure of the OSC, and the hydrocarbon conversion efficiency of the catalyst, do not normally correlate except under severe aging of the catalyst. As a result, this technique has poor resolution with only the ability to determine gross changes in the catalyst's conversion efficiency, and can be prone to misdiagnosis.

Another problem with the switch ratio technique is that it relies on the air/fuel modulations that result from the error in the air/fuel controller. These modulations can change or even be eliminated with advanced controller strategies, leaving no method of catalyst diagnostic with the standard HEGO sensors.

Other catalyst monitors relying on calorimetric or hydrocarbon sensors have been proposed, but these sensors only operate under lean conditions when there is sufficient oxygen to reduce the existing reducing species.

What is needed is an improved system for estimating tailpipe emissions in a vehicle that complies with the OBD requirements over the full FTP cycle including rich air-fuel excursions. The new approach should also have improved accuracy and resolution, and be less complex.

BRIEF DESCRIPTION OF THE DRAWINGS

FIG. 7 is a flow chart illustrating a method embodiment of the invention; and

DETAILED DESCRIPTION OF A PREFERRED EMBODIMENT

A system and method measures hydrocarbon conversion efficiency of a catalytic converter. Total-combustible sensors, are positioned to measure exhaust gas on both sides of the catalytic converter. Signals from these sensors, have a magnitude comprised of a first portion, dependent on a concentration of the hydrocarbon gas in the gas stream, and a second portion, dependent on a concentration of the other combustible gasses in the gas stream, where a magnitude relationship between the first portion and the second portion is variable when the gas stream transitions into a region on the rich side of stoichiometry. The signals from these sensors, are filtered so that a magnitude relationship between a first and second portion of the filtered signals is constant when the gas stream transitions into the region on the rich-side of stoichiometry. A hydrocarbon conversion efficiency metric is computed dependent on the filtered signals. The hydrocarbon conversion efficiency metric is then integrated and compared to a threshold and an out-of-compliance signal is provided when the integrated hydrocarbon conversion efficiency metric exceeds the threshold. The threshold can be predetermined based on engine-catalytic converter testing, and also adaptive to powertrain operating conditions. Before the details of the inventive structure are revealed, some background on performance of total-combustible sensors (used in the preferred embodiment) will be detailed.

A total-combustible sensor is a sensor that provides a signal indicative of a concentration of a multitude of gasses combusted within the total-combustible sensor. In an automotive application, a gas-selective sensor can be designed to measure substantially all gasses in a post-catalytic converter gas stream. From an emissions viewpoint, magnitudes of unburned carbon monoxide (CO) gas and hydrocarbon (HC) gas in the post-catalytic converter gas stream need to be detected. Some performance aspects of a total-combustible gas sensor will be introduced next.

Figure 1:
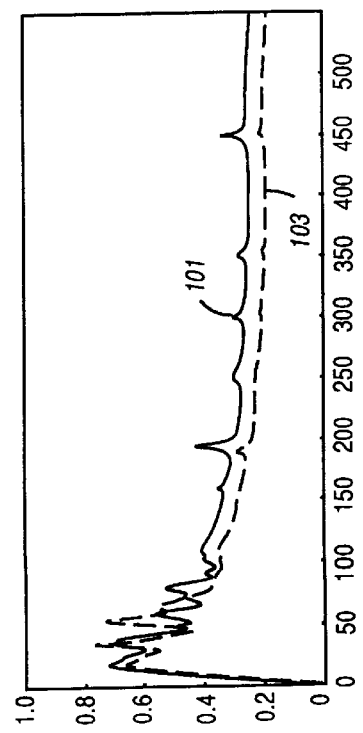
FIG. 1 is a graph illustrating a total-combustible gas signal from a total-combustible sensor, and a hydrocarbon (HC) reference signal output from an HC-selective laboratory reference sensor, both coupled aft of a catalytic converter for measuring tail-pipe gasses during an FTP (Federal Test Procedure) emissions test.

FIG. 1 is a graph showing data collected from a federal test procedure (FTP) run on a production vehicle from startup to 500 seconds. Reference number 101 shows a total-combustible gas signal, output from a total-combustible sensor coupled to an output side (aft) of a catalytic converter that is coupled to a spark-ignited engine. The spark-ignited engine exhausts a gas stream comprising both HC gas and other gasses, principally CO gas. Hence, the total-combustible gas signal 101 has a magnitude comprised of a first portion, dependent on a concentration of the hydrocarbon gas in the catalyzed gas stream, and a second portion, dependent on a concentration of the other combustible gasses, principally CO gas in the catalyzed gas stream. Perturbations in the total-combustible gas signal 101 are strongly influenced by a CO gas concentration present in the gas stream resulting from the FTP cycle demanded rich fuel-air ratio excursions of the engine.

FIG. 1 also shows an HC gas signal 103 derived from a laboratory reference sensor also coupled to the output side (aft) of the catalytic converter. Notice that the perturbations in the HC gas signal 103 do not always match the perturbations in the total-combustible gas signal 101. The difference is largely related to the behavior of the CO gas component making up the second portion of the magnitude of the total-combustible gas signal 101. Absent the CO gas behavior, the total-combustible gas signal 101 would be a relatively accurate measure of HC gas output from the catalytic converter.

Figure 2:
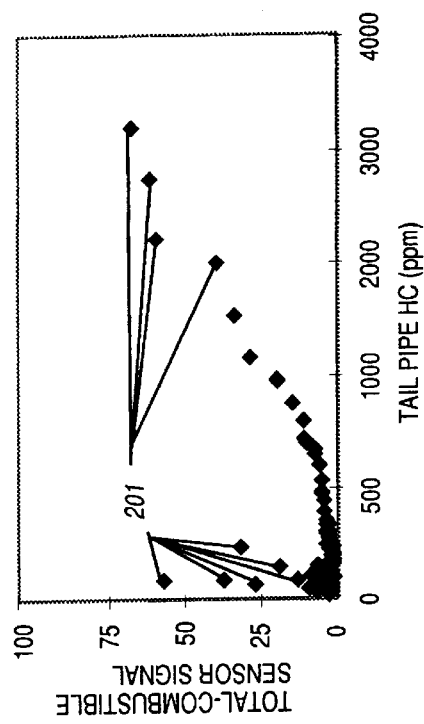
FIG. 2 is a graph showing a correlation between tail-pipe hydrocarbons as measured with the total-combustible sensor and the HC-selective laboratory reference sensor.

FIG. 2 shows another graph that illustrates a correlation between HC gas measured on the output side (aft) of a catalytic converter as measured with the total-combustible sensor in units of percentage output, and the HC-selective laboratory reference sensor, in terms of parts per million (PPM). The displayed data is second-by-second data taken during the first 1400 seconds of the FTP test cycle. Individual points on the figures represent the HC-selective laboratory reference sensor measured HC gas concentration and the total-combustible gas sensor signal during one second periods during the test. Reference number 201 shows that some of the data does not correlate well between the sensors. Essentially the data 201 is positioned well above the normal trend during measurements where CO gas dominates the total-combustible sensor. These poorly correlated datum occur primarily during rich excursions due to the relative magnitude contributions of HC gas and CO gas behavior to the total-combustible gas signal. If the proportional relationship between the contribution of HC gas and CO gasses in the total-combustible sensor's output signal could be made constant, or predictable, then the output of the total-combustible gas sensor could be used to measure absolute HC gas output.

Figure 3:
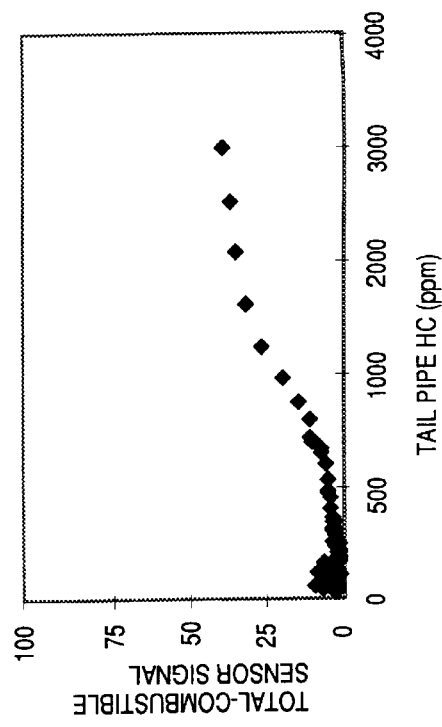
FIG. 3 is a graph illustrating an improved correlation between tail-pipe hydrocarbons as measured with the total-combustible sensor and the HC-selective laboratory reference sensor, after the total-combustible gas signal has been filtered in accordance with an aspect of the invention.

FIG. 3 is a graph illustrating an improved correlation between tail-pipe hydrocarbons (measured aft of the catalytic converter) as measured with the total-combustible sensor and the HC-selective laboratory reference sensor, after the signal output from the total-combustible sensor has been filtered, in accordance with one aspect of the invention. Essentially, the raw total-combustible sensor signal is processed through a non-linear filter which removes the influence of the CO gas behavior during rich air-fuel ratio excursions demanded by the FTP test cycle. So, after filtering, the proportional relationship between the contribution of HC gas and CO gasses in the total-combustible sensor's output signal is now held (constant) correlatable.

Figure 4:
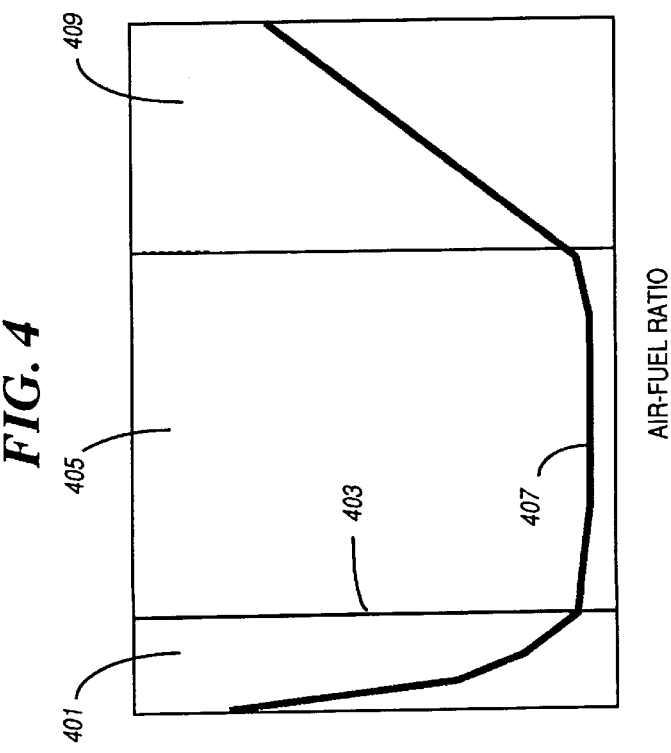
FIG. 4 a graph showing carbon monoxide concentration in an exhaust gas stream as a function of air-fuel ratio.

FIG. 4 a graph showing CO gas concentration 407 in an exhaust gas stream as a function of air-fuel ratio. Reference number 401 refers to a rich-region of the air-fuel ratio; reference number 403 shows a stoichiometric air-fuel ratio; and reference number 409 refers to a lean-region of the air-fuel ratio. Normally an engine is cycled in a small region about the 403 line. Then, on average the air-fuel ratio is stoichiometric and the emission of pollutants can be controlled dependent on the performance demands put on the engine and power train. This graph makes it clear that as the engine's air-fuel ratio ventures into the rich-region a magnitude of the CO gas increases significantly. Details of how both a system and method embodiment operate will be presented next.

Figure 5:
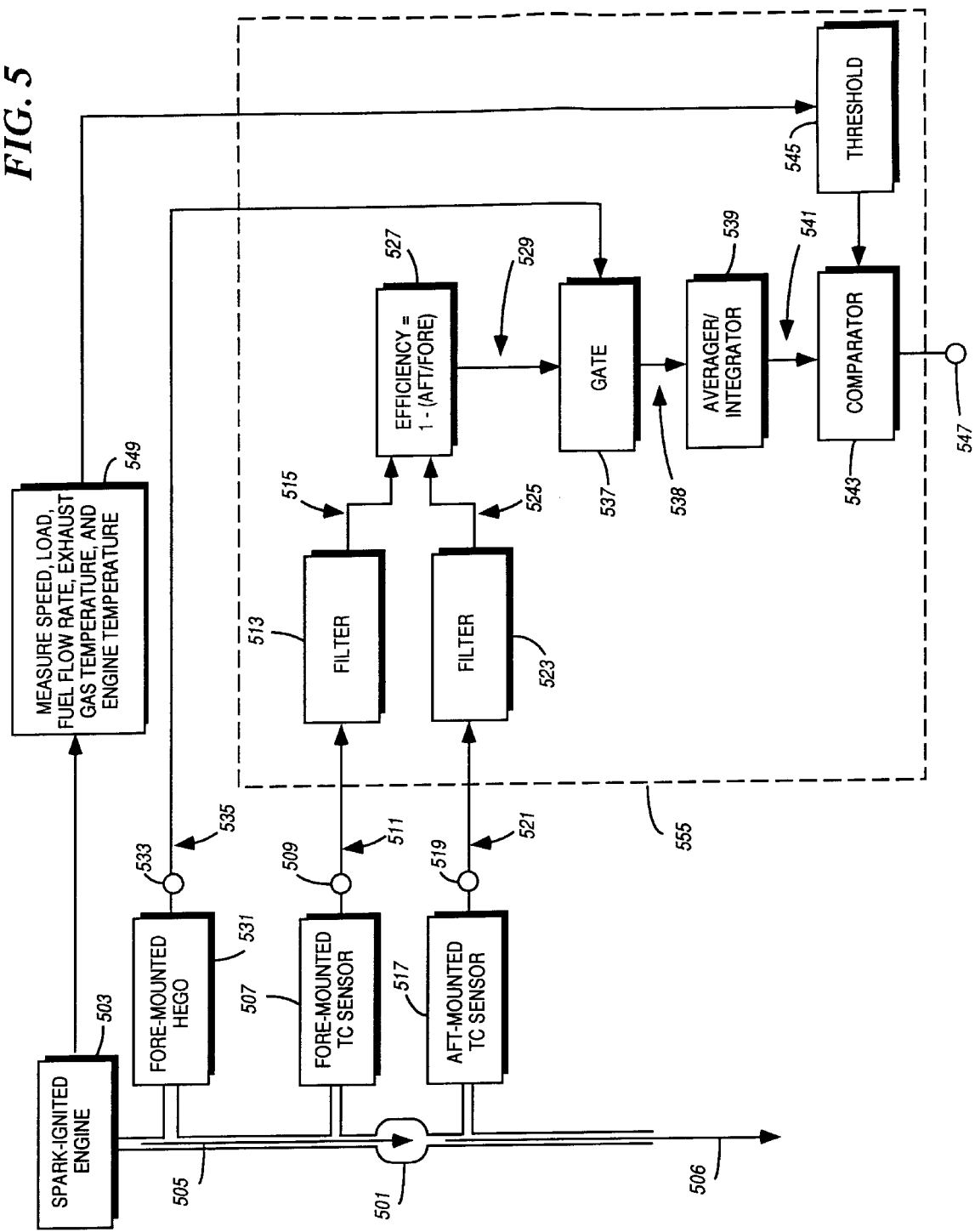
FIG. 5 is a schematic block diagram suitable for implementing a system embodiment of the invention.

FIG. 5 is a schematic block diagram suitable for implementing a system embodiment of the invention.

A catalytic converter 501 is coupled to an exhaust portion of a spark-ignited engine 503. The catalytic converter 501 is used to remove significant portions of previously uncombusted pollutants from a combusted gas stream 505 output from the spark-ignited engine 503. The catalytic converter 501 exhausts a catalyzed gas stream 506, comprising HC gas and other gasses, primarily nitrogen (NO), carbon dioxide ($CO_2$), and water ($H_2O$).

A first sensor 507, a fore-catalytic-converter-mounted total-combustible gas sensor coupled between the engine 503 and the catalytic converter 501, has an output terminal 509 that provides a total-combustible gas input signal 511. The total-combustible gas input signal 511 has a magnitude comprised of a first portion, dependent on a concentration of the hydrocarbon gas in the combusted gas stream 505, and a second portion, dependent on a concentration of the other combustible gasses in the combusted gas stream 505. A magnitude relationship between the first portion and the second portion is variable when the combusted gas stream 505 transitions into a region on the rich side of stoichiometry.

The type of sensor used to measure total-combustibles may be a calorimetric type. Preferably, the total-combustible gas sensor 507 uses to two adjacent RTD (Resistive Thermal Device) temperature sensors with independent heater coils. A catalyst layer is deposited on top of one of the RTD devices, and a non-catalyst layer, of similar thermal characteristics, is deposited on top of the other RTD device. The catalyst layer uses a formulation similar to a contemporary three-way exhaust gas catalyst with a capability to store considerable oxygen during lean-region air-fuel ratio operation for reduction of reducing gas species under rich-region air-fuel ratio operation. The total-combustible gas sensor 507 detects energy release from chemical reactions primarily from HC gas and CO gas output aft of the engine 503. The energy is detected via temperature changes in the RTD device, or alternatively via reduced electrical power that is supplied to the independent heater coil, which is controlled to keep the RTD device at a steady temperature, or heat flux. The second (non-catalyst RTD device) heater is used to develop a reference signal to subtract out the normal heat transfer effects of conduction, radiation, and convection present at the total-combustible gas sensor's 507 physical location. The total-combustible gas sensor 507 is placed in a diffusion limited housing that is placed directly in the exhaust pipe, aft of the engine 503. Alternatively, other sensor constructions and mounting configurations can be used as long as the alternative sensor reacts to HC gas and CO gas in a correlatable manner.

A first filter 513 is operatively coupled to the output terminal 509 of the total-combustible gas sensor 507, and provides a filtered total-combustible gas input signal 515 dependent on the total-combustible gas input signal 511. Preferably, the filter 513 is a non-linear type—such as a median filter, or a trimmed-mean filter. The nonlinear median filter successfully removes the energy from the CO gas related behavior on rich air-fuel ratio excursions by removing high-order behavior. In contrast, a linear filter would linearly attenuate both the CO gas transient and the underlying HC gas data equally, and therefore would not enable recovery of correlation between the HC gas and CO gas contributions to the total-combustible gas input signal 511. The filtered total-combustible gas input signal 515 has a magnitude comprised of a first portion, dependent on the first portion of the total-combustible gas input signal 511, and a second portion, dependent on the second portion of the total-combustible gas signal 511, wherein a magnitude relationship between the first portion and the second portion of the filtered total-combustible gas input signal 515 is substantially constant when the combusted gas stream 505 transitions into the region on the rich-side of stoichiometry.

A second sensor, an aft-catalytic-converter-mounted total-combustible gas sensor 517, is coupled to an exhaust side of the catalytic converter 501. The second sensor 517 has an output terminal 519 that provides a total-combustible gas output signal 521. The total-combustible gas output signal 521 has a magnitude comprised of a first portion, dependent on a concentration of the hydrocarbon gas in the catalyzed gas stream 506, and a second portion, dependent on a concentration of the other combustible gasses in the catalyzed gas stream 506. A magnitude relationship between the first portion and the second portion is variable when the catalyzed gas stream 506 transitions into a region on the rich side of stoichiometry.

A second filter 523 is operatively coupled to the output terminal 519 of the total-combustible gas sensor 517. The second filter 523 provides a filtered total-combustible gas output signal 525 dependent on the total-combustible gas output signal 511. The filtered total-combustible gas output signal 525 has a magnitude comprised of a first portion, dependent on the first portion of the total-combustible gas output signal 521, and a second portion, dependent on the second portion of the total-combustible gas output signal 521. A magnitude relationship between the first portion and the second portion of the filtered total-combustible gas output signal 525 is substantially constant when the catalyzed gas stream 506 transitions into the region on the rich-side of stoichiometry.

A computing element 527 is coupled to both the first and second filters 513, 523. The computing element 527 provides an instantaneous catalyst efficiency metric 529 dependent on the filtered hydrocarbon gas input signal 515 and the filtered hydrocarbon gas output signal 525. The computing element 527 uses the following deterministic equation to determine the efficiency of the catalytic converter:

efficiency=1−(filtered total-combustible gas output signal/filtered total-combustible gas input signal)

A switching-type exhaust gas oxygen sensor 531, preferably a HEGO, is coupled between the engine 503 and the catalytic converter 501. The switching-type exhaust gas oxygen sensor 531 has an output terminal 533 that provides a gate signal 535 that has a rich-state and a lean-state, dependent on fuel and oxygen content of the catalyzed gas stream 506.

A gate 537 is coupled between the output terminal 533 of the switching-type exhaust gas oxygen sensor 531 and the computing element 527. The gate 537 provides the instantaneous catalyst efficiency metric 538 when the gate signal 535 indicates the lean-state.

An integrator (or averager) 539 is coupled to the gate 537. The integrator 539 provides an integrated (or average) catalyst efficiency metric 541, dependent on the instantaneous catalyst efficiency metric 538 provided by the gate 537.

A comparator 543 compares the integrated catalyst efficiency metric 541 to a threshold, set by a threshold setting device 545 and indicates an out-of-compliance signal 547 when the integrated catalyst efficiency metric 541 exceeds the threshold. The threshold is determined by emissions regulations and can be predetermined based on engine-catalytic converter-vehicular testing, and also be made adaptive to other powertrain operating conditions. If based on operating conditions, a measurement device/system 549 measures at least one powertrain characteristic selected from the group of: engine speed, engine load, fuel flow rate, exhaust gas temperature, and engine temperature. The (emissions) threshold is then set based on one or more of the measured operating conditions.

Figure 6:
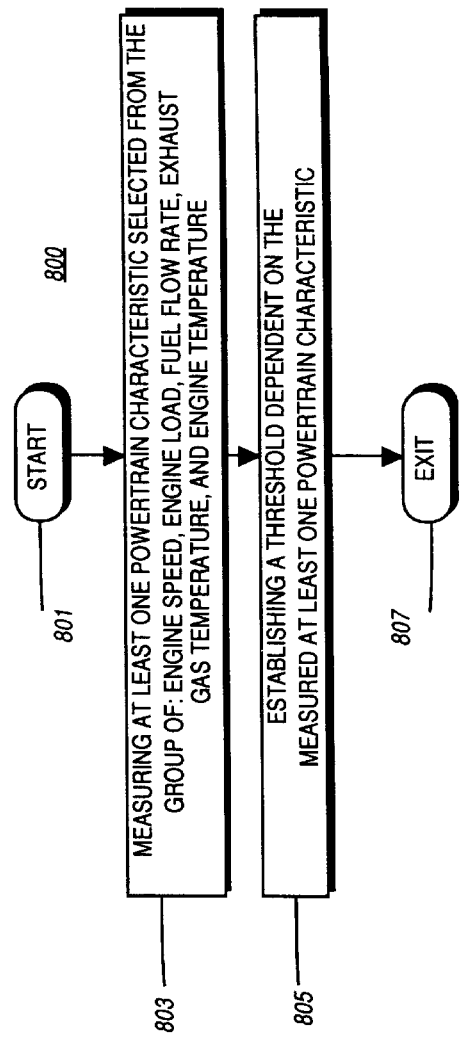
FIG. 6 is a schematic block diagram supportive of a method embodiment of the invention.

FIG. 6 is a schematic block diagram supportive of a method embodiment of the invention. A computer 601 replaces the earlier detailed portion of the system embodiment 555. The computer 601 is preferably constructed comprising a Motorola MC68332 microcontroller. The Motorola MC68332 microcontroller is programmed to execute the preferred method steps described later in the flow charts shown in FIG. 7 and FIG. 8. Another microcontroller, or other circuits could also be used to execute the later-described method steps.

FIG. 7 is a flow chart illustrating a method embodiment of the invention. The method, or routine 700, commences at a start step 701. In step 703, the computer 601 senses the combusted gas stream via the fore-mounted TC sensor which provides a total-combustible gas input signal. The total-combustible gas input signal has a magnitude comprised of a first portion, dependent on a concentration of the hydrocarbon gas in the combusted gas stream, and a second portion, dependent on a concentration of the other combustible gasses in the combusted gas stream. A magnitude relationship between the first portion and the second portion is variable when the combusted gas stream transitions into a region on the rich side of stoichiometry.

In step 705, the total-combustible input gas signal is filtered and a filtered total-combustible gas input signal is provided dependent thereon. The filtered total-combustible gas input signal has a magnitude comprised of a first portion, dependent on the first portion of the total-combustible gas input signal, and a second portion, dependent on the second portion of the total-combustible gas signal, wherein a magnitude relationship between the first portion and the second portion of the filtered total-combustible gas input signal is substantially constant when the combusted gas stream transitions into the region on the rich-side of stoichiometry.

Next, in step 707, the computer senses the catalyzed gas stream via the aft-mounted TC sensor which provides a total-combustible gas output signal. The total-combustible gas output signal has a magnitude comprised of a first portion, dependent on a concentration of the hydrocarbon gas in the catalyzed gas stream, and a second portion, dependent on a concentration of the other combustible gasses in the catalyzed gas stream, where a magnitude relationship between the first portion and the second portion is variable when the catalyzed gas stream transitions into a region on the rich side of stoichiometry.

Then, in step 709, the total-combustible gas output signal is filtered and a filtered total-combustible gas output signal is provided dependent thereon. The filtered total-combustible gas output signal has a magnitude comprised of a first portion, dependent on the first portion of the total-combustible gas output signal, and a second portion, dependent on the second portion of the total-combustible gas output signal. A magnitude relationship between the first portion and the second portion of the filtered total-combustible gas output signal is substantially constant when the catalyzed gas stream transitions into the region on the rich-side of stoichiometry.

Next, in step 711 an instantaneous catalyst efficiency metric is computed dependent on the filtered hydrocarbon gas input signal and the filtered hydrocarbon gas output signal using the following deterministic equation:

efficiency=1−(filtered total-combustible gas output signal/filtered total-combustible gas input signal)

Then, in step 713, the combusted gas stream is measured using a fore-mounted HEGO, (a switching-type exhaust gas oxygen sensor). The HEGO provides a gate signal for indicating a rich-state and a lean-state of the combusted gas stream exhausted from the engine.

In step 715 the instantaneous catalyst efficiency metric is integrated, and an integrated catalyst efficiency metric is provided when the gate signal is indicating the lean-state. The integrated catalyst efficiency metric is provided only when the gate signal is indicating the lean-state because the filters 513 and 523 remove the CO behavior only during short rich-fuel excursions, and not for long excursions. So the gate signal is applied to essentially mask the integrated catalyst efficiency metric during long rich-fuel excursions.

Next, in step 717, the integrated catalyst efficiency metric is compared to a threshold. When the integrated catalyst efficiency metric exceeds the threshold an out-of-compliance signal is indicated. The routine 700 ends at an exit step 719.

Figure 8:
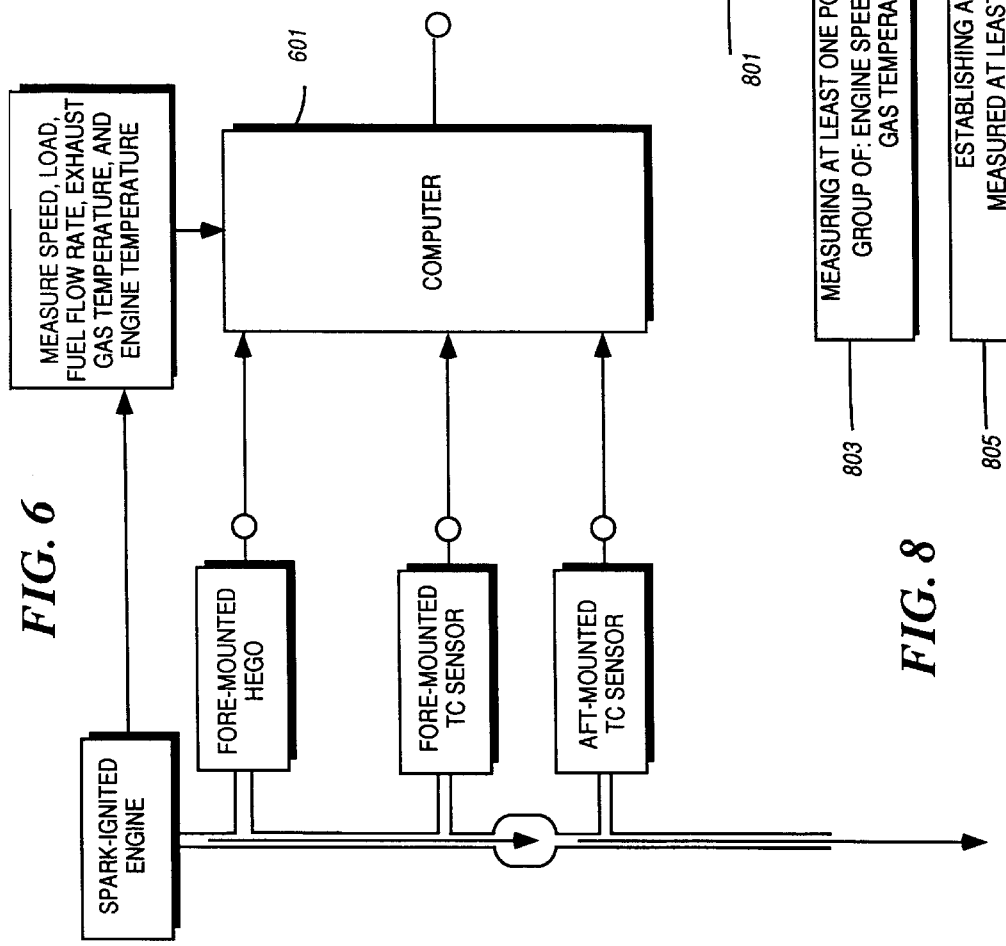
FIG. 8 is a flow chart showing further steps associated with the method illustrated in FIG. 7.

FIG. 8 is a flow chart showing further steps associated with the method illustrated in FIG. 7. The routine 800 commences at a start step 801. Next, in step 803, at least one powertrain characteristic selected from the group of: engine speed, engine load, fuel flow rate, exhaust gas temperature, and engine temperature, is measured.

Then, in step 805, threshold is established, or the existing threshold is adapted/modified, dependent on the measured at least one powertrain characteristic. In step 807 the routine 800 is exited.

An improved system for estimating tailpipe emissions in a vehicle that complies with the OBD requirements over the full FTP cycle including rich air-fuel excursions has been detailed above. The improved approach directly measures magnitudes of both engine-exhausted and catalyst-exhausted emissions of HC gas and CO gas. Catalyst efficiency is computed from the direct measurements and compared to an emission-regulation-set threshold. This system and method are less complex, more accurate, is capable of finer resolution, and is easier to manufacture than prior art schemes.

What is claimed is:

1. A method for measuring hydrocarbon conversion efficiency of a catalytic converter coupled to an engine exhausting a combusted gas stream comprised of hydrocarbon gas and other combustible gasses to the catalytic converter, the catalytic converter exhausting a catalyzed gas stream dependent thereon, the method comprising steps of:

sensing the combusted gas stream and providing a total-combustible gas input signal dependent thereon, the total-combustible gas input signal having a magnitude comprised of a first portion, dependent on a concentration of the hydrocarbon gas in the combusted gas stream, and a second portion, dependent on a concentration of the other combustible gasses in the combusted gas stream, where a magnitude relationship between the first portion and the second portion is variable when the combusted gas stream transitions into a region on the rich side of stoichiometry;

filtering the total-combustible input gas signal and providing a filtered total-combustible gas input signal dependent thereon, the filtered total-combustible gas input signal having a magnitude comprised of a first portion, dependent on the first portion of the total-combustible gas input signal, and a second portion, dependent on the second portion of the total-combustible gas signal, wherein a magnitude relationship between the first portion and the second portion of the filtered total-combustible gas input signal is substantially constant when the combusted gas stream transitions into the region on the rich-side of stoichiometry;

sensing the catalyzed gas stream and providing a total-combustible gas output signal dependent thereon, the total-combustible gas output signal having a magnitude comprised of a first portion, dependent on a concentration of the hydrocarbon gas in the catalyzed gas stream, and a second portion, dependent on a concentration of the other combustible gasses in the catalyzed gas stream, where a magnitude relationship between the first portion and the second portion is variable when the catalyzed gas stream transitions into a region on the rich side of stoichiometry;

filtering the total-combustible gas output signal and providing a filtered total-combustible gas output signal dependent thereon, the filtered total-combustible gas output signal having a magnitude comprised of a first portion, dependent on the first portion of the total-combustible gas output signal, and a second portion, dependent on the second portion of the total-combustible gas output signal, wherein a magnitude relationship between the first portion and the second portion of the filtered total-combustible gas output signal is substantially constant when the catalyzed gas stream transitions into the region on the rich-side of stoichiometry; and computing an instantaneous catalyst efficiency metric dependent on the filtered total-combustible gas input signal and the filtered total-combustible gas output signal.

2. A method in accordance with claim 1 further comprising the steps of:

measuring the combusted gas stream using a switching-type exhaust gas oxygen sensor and providing a gate signal having a rich-state and a lean-state;

integrating the instantaneous catalyst efficiency metric and providing an integrated catalyst efficiency metric, when the gate signal is indicating the lean-state; and comparing the integrated catalyst efficiency metric to a threshold and indicating an out-of-compliance signal when the integrated catalyst efficiency metric exceeds the threshold.

3. A method in accordance with claim 1 wherein both steps of filtering comprise steps of median filtering.

4. A method in accordance with claim 1 wherein both steps of filtering comprise steps trimmed-mean filtering.

5. A method in accordance with claim 2 further comprising the step of:

measuring at least one powertrain characteristic selected from the group of: engine speed, engine load, fuel flow rate, exhaust gas temperature, and engine temperature; and wherein the threshold is established dependent on the measured at least one powertrain characteristic.

6. A method in accordance with claim 1 wherein the step of computing a catalyst efficiency metric comprises computing a catalyst efficiency metric using the following deterministic equation: efficiency=1−(filtered total-combustible gas output signal/filtered total-combustible gas input signal.

7. A method for measuring hydrocarbon conversion efficiency of a catalytic converter coupled to an engine exhausting a combusted gas stream comprised of hydrocarbon gas and other combustible gasses to the catalytic converter, the catalytic converter exhausting a catalyzed gas stream dependent thereon, the method comprising steps of:

sensing the combusted gas stream and providing a total-combustible gas input signal dependent thereon, the total-combustible gas input signal having a magnitude comprised of a first portion, dependent on a concentration of the hydrocarbon gas in the combusted gas stream, and a second portion, dependent on a concentration of the other combustible gasses in the combusted gas stream, where a magnitude relationship between the first portion and the second portion is variable when the combusted gas stream transitions into a region on the rich side of stoichiometry;

filtering the total-combustible input gas signal and providing a filtered total-combustible gas input signal dependent thereon, the filtered total-combustible gas input signal having a magnitude comprised of a first portion, dependent on the first portion of the total-combustible gas input signal, and a second portion, dependent on the second portion of the total-combustible gas signal, wherein a magnitude relationship between the first portion and the second portion of the filtered total-combustible gas input signal is substantially constant when the combusted gas stream transitions into the region on the rich-side of stoichiometry;

sensing the catalyzed gas stream and providing a total-combustible gas output signal dependent thereon, the total-combustible gas output signal having a magnitude comprised of a first portion, dependent on a concentration of the hydrocarbon gas in the catalyzed gas stream, and a second portion, dependent on a concentration of the other combustible gasses in the catalyzed gas stream, where a magnitude relationship between the first portion and the second portion is variable when the catalyzed gas stream transitions into a region on the rich side of stoichiometry;

filtering the total-combustible gas output signal and providing a filtered total-combustible gas output signal dependent thereon, the filtered total-combustible gas output signal having a magnitude comprised of a first portion, dependent on the first portion of the total-combustible gas output signal, and a second portion, dependent on the second portion of the total-combustible gas output signal, wherein a magnitude relationship between the first portion and the second portion of the filtered total-combustible gas output signal is substantially constant when the catalyzed gas stream transitions into the region on the rich-side of stoichiometry; and computing an instantaneous catalyst efficiency metric dependent on the filtered hydrocarbon gas input signal and the filtered hydrocarbon gas output signal using the following deterministic equation: efficiency=1−(filtered total-combustible gas output signal/filtered total-combustible gas input signal;

measuring the combusted gas stream using a switching-type exhaust gas oxygen sensor and providing a gate signal having a rich-state and a lean-state;

integrating the instantaneous catalyst efficiency metric and providing an integrated catalyst efficiency metric, when the gate signal is indicating the lean-state; and comparing the integrated catalyst efficiency metric to a threshold and indicating an out-of-compliance signal when the integrated catalyst efficiency metric exceeds the threshold.

8. A method in accordance with claim 7 wherein both steps of filtering comprise steps of median filtering.

9. A method in accordance with claim 7 wherein both steps of filtering comprise steps of trimmed-mean filtering.

10. A method in accordance with claim 8 further comprising the step of:

measuring at least one powertrain characteristic selected from the group of: engine speed, engine load, fuel flow rate, exhaust gas temperature, and engine temperature; and wherein the threshold is established dependent on the measured at least one powertrain characteristic.

11. A method in accordance with claim 9 further comprising the step of:

measuring at least one powertrain characteristic selected from the group of: engine speed, engine load, fuel flow rate, exhaust gas temperature, and engine temperature; and wherein the threshold is established dependent on the measured at least one powertrain characteristic.

12. A system for measuring hydrocarbon conversion efficiency of a catalytic converter, the system having an engine exhausting a combusted gas stream to the catalytic converter, the catalytic converter exhausting a catalyzed gas stream comprised of hydrocarbon gas and other combustible gasses, the system comprising:

a first sensor coupled between the engine and the catalytic converter, the first sensor having an output terminal for providing a total-combustible gas input signal having a magnitude comprised of a first portion, dependent on a concentration of the hydrocarbon gas in the combusted gas stream, and a second portion, dependent on a concentration of the other combustible gasses in the combusted gas stream, where a magnitude relationship between the first portion and the second portion is variable when the combusted gas stream transitions into a region on the rich side of stoichiometry; and a first filter, operatively coupled to the output terminal of the first sensor, for providing a filtered total-combustible gas input signal dependent on the total-combustible gas input signal, the filtered total-combustible gas input signal having a magnitude comprised of a first portion, dependent on the first portion of the total-combustible gas input signal, and a second portion, dependent on the second portion of the total-combustible gas signal, wherein a magnitude relationship between the first portion and the second portion of the filtered total-combustible gas input signal is substantially constant when the combusted gas stream transitions into the region on the rich-side of stoichiometry;

a second sensor coupled to the catalytic converter, the second sensor having an output terminal for providing a total-combustible gas output signal, the total-combustible gas output signal having a magnitude comprised of a first portion, dependent on a concentration of the hydrocarbon gas in the catalyzed gas stream, and a second portion, dependent on a concentration of the other combustible gasses in the catalyzed gas stream, where a magnitude relationship between the first portion and the second portion is variable when the catalyzed gas stream transitions into a region on the rich side of stoichiometry; and a second filter, operatively coupled to the output terminal of the second sensor, for providing a filtered total-combustible gas output signal dependent on the total-combustible gas output signal, the filtered total-combustible gas output signal having a magnitude comprised of a first portion, dependent on the first portion of the total-combustible gas output signal, and a second portion, dependent on the second portion of the total-combustible gas output signal, wherein a magnitude relationship between the first portion and the second portion of the filtered total-combustible gas output signal is substantially constant when the catalyzed gas stream transitions into the region on the rich-side of stoichiometry; and a computing element coupled to both the first and second filters, the computing element providing an instantaneous catalyst efficiency metric dependent on the filtered hydrocarbon gas input signal and the filtered hydrocarbon gas output signal.

13. A system in accordance with claim 12 further comprising:

a switching-type exhaust gas oxygen sensor coupled between the engine and the catalytic converter, the switching-type exhaust gas oxygen sensor having an output terminal providing a gate signal having a rich-state and a lean-state, dependent on fuel and oxygen content of the catalyzed gas stream;

a gate coupled between the output terminal of the switching-type exhaust gas oxygen sensor and the computing element, the gate providing the instantaneous catalyst efficiency metric when the gate signal indicates the lean-state;

an averager coupled to the gate, the averager providing an average catalyst efficiency metric, dependent on the instantaneous catalyst efficiency metric provided by the gate; and a comparator for comparing the integrated catalyst efficiency metric to a threshold and indicating an out-of-compliance signal when the integrated catalyst efficiency metric exceeds the threshold.

14. A system in accordance with claim 12 wherein both the first and second sensors are total-combustible sensors.

15. A system in accordance with claim 12 wherein both the first and second filters are median filters.

16. A system in accordance with claim 12 wherein both the first and second filters are trimmed-mean filters.

17. A system in accordance with claim 13 further comprising:

a measurement device for measuring at least one powertrain characteristic selected from the group of: engine speed, engine load, fuel flow rate, exhaust gas temperature, and engine temperature; and wherein the threshold is established dependent on the measured at least one powertrain characteristic.

18. A system for measuring hydrocarbon conversion efficiency of a catalytic converter, the system having an engine exhausting a combusted gas stream to the catalytic converter, the catalytic converter exhausting a catalyzed gas stream comprised of hydrocarbon gas and other combustible gasses, the system comprising:

a first sensor coupled between the engine and the catalytic converter, the first sensor having an output terminal for providing a total-combustible gas input signal having a magnitude comprised of a first portion, dependent on a concentration of the hydrocarbon gas in the combusted gas stream, and a second portion, dependent on a concentration of the other combustible gasses in the combusted gas stream, where a magnitude relationship between the first portion and the second portion is variable when the combusted gas stream transitions into a region on the rich side of stoichiometry; and a first filter, operatively coupled to the output terminal of the first sensor, for providing a filtered total-combustible gas input signal dependent on the total-combustible gas input signal, the filtered total-combustible gas input signal having a magnitude comprised of a first portion, dependent on the first portion of the total-combustible gas input signal, and a second portion, dependent on the second portion of the total-combustible gas signal, wherein a magnitude relationship between the first portion and the second portion of the filtered total-combustible gas input signal is substantially constant when the combusted gas stream transitions into the region on the rich-side of stoichiometry;

a second sensor coupled to the catalytic converter, the second sensor having an output terminal for providing a total-combustible gas output signal, the total-combustible gas output signal having a magnitude comprised of a first portion, dependent on a concentration of the hydrocarbon gas in the catalyzed gas stream, and a second portion, dependent on a concentration of the other combustible gasses in the catalyzed gas stream, where a magnitude relationship between the first portion and the second portion is variable when the catalyzed gas stream transitions into a region on the rich side of stoichiometry; and a second filter, operatively coupled to the output terminal of the second sensor, for providing a filtered total-combustible gas output signal dependent on the total-combustible gas output signal, the filtered total-combustible gas output signal having a magnitude comprised of a first portion, dependent on the first portion of the total-combustible gas output signal, and a second portion, dependent on the second portion of the total-combustible gas output signal, wherein a magnitude relationship between the first portion and the second portion of the filtered total-combustible gas output signal is substantially constant when the catalyzed gas stream transitions into the region on the rich-side of stoichiometry;

a computing element coupled to both the first and second filters, the computing element providing an instantaneous catalyst efficiency metric dependent on the filtered hydrocarbon gas input signal and the filtered hydrocarbon gas output signal;

a switching-type exhaust gas oxygen sensor coupled between the engine and the catalytic converter, the switching-type exhaust gas oxygen sensor having an output terminal providing a gate signal having a rich-state and a lean-state, dependent on fuel and oxygen content of the catalyzed gas stream;

a gate coupled between the output terminal of the switching-type exhaust gas oxygen sensor and the computing element, the gate providing the instantaneous catalyst efficiency metric when the gate signal indicates the lean-state; and an integrator coupled to the gate, the integrator providing an integrated catalyst efficiency metric, dependent on the instantaneous catalyst efficiency metric provided by the gate;

a measurement device for measuring at least one power-train characteristic selected from the group of: engine speed, engine load, fuel flow rate, exhaust gas temperature, and engine temperature and for establishing a threshold dependent thereon; and a comparator for comparing the integrated catalyst efficiency metric to the threshold and indicating an out-of-compliance signal when the integrated catalyst efficiency metric exceeds the threshold.

19. A system in accordance with claim 18 wherein both the first and second sensors are total-combustible sensors.

20. A system in accordance with claim 19 wherein both the first and second filters are median filters.

21. A system in accordance with claim 19 wherein both the first and second filters are trimmed-mean filters.

* * * * *